Patented Mar. 5, 1946

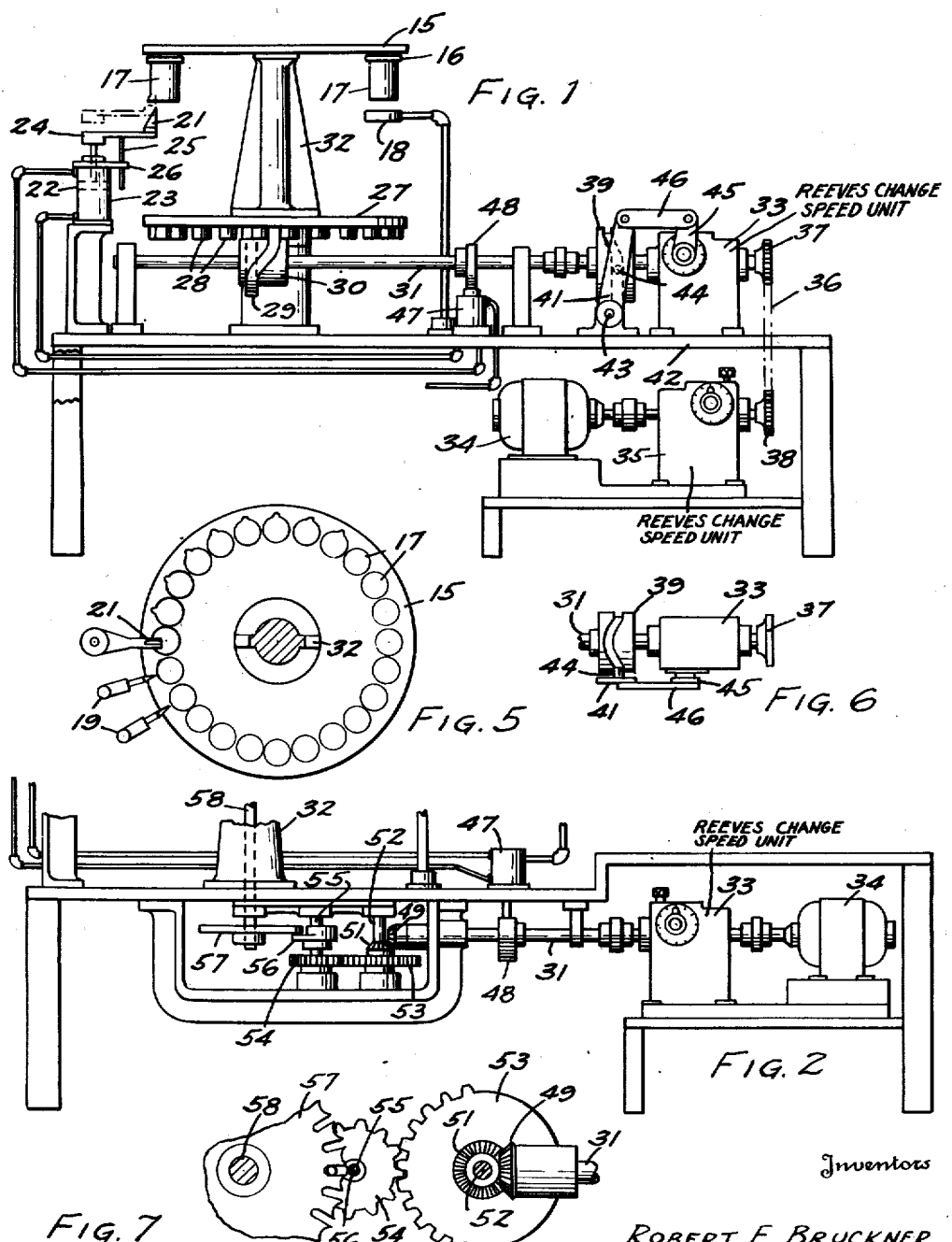

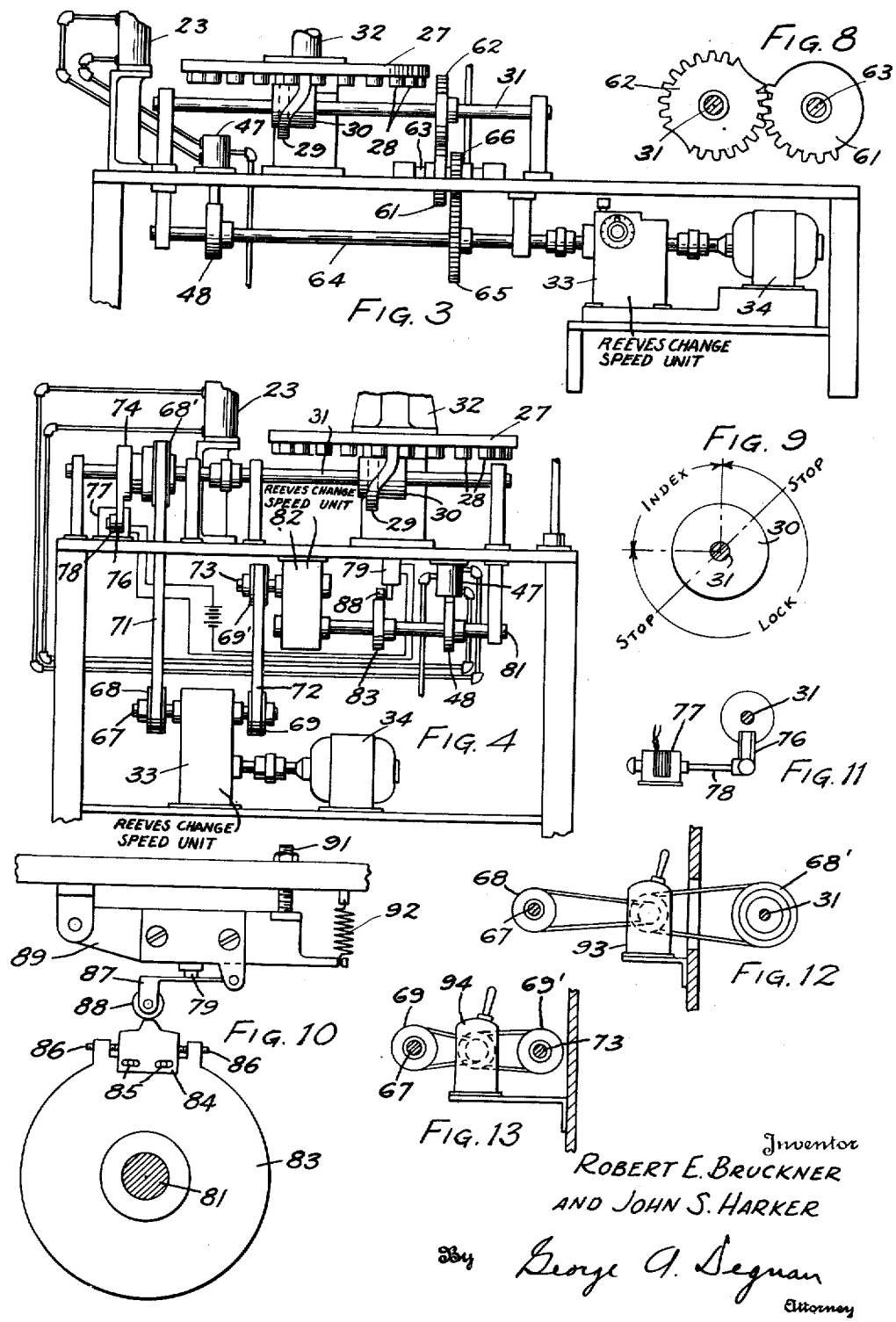

2,395,803

UNITED STATES PATENT OFFICE 2,395,803

INDEXING MECHANISM

Robert E. Bruckner and John S. Harker, Vineland, N. J., assignors to Kimble Glass Company, Vineland, N. J., a corporation of Illinois Application September 4, 1942, Serial No. 457,354

3 Claims. (Cl. 74—393)

The present invention relates to indexing mechanism and more particularly to means for varying the speed of a driven shaft while maintaining the speed of a driving shaft constant.

In certain types of machinery it is necessary to drive an element intermittently, the dwell or arrest of the element being timed for a particular operation. The indexing period is timed accordingly, but frequently is too long. In glass machinery, for instance, glass ware is heated at several stations and afterward shaped or tooled, the dwell occurring at those times when the ware is juxtaposed to the flames and tools. If the indexing period be too long, the ware will lose much of its heat between heating stations, thus prolonging the heating operations and wasting fuel.

It is one of the objects of this invention so to control index mechanism for driving a driven member that the indexing period may be shortened but the dwell be relatively long.

It is also an object of the invention to provide mechanism for varying within a wide range the ratio of indexing to the dwell.

It is a further object of the invention to provide mechanism which insures positive uniform acceleration and retardation of an indexed heavy-inertia member with sufficient constraint on retardation to eliminate over-run. This constraint is maintained on the driven shaft during dwell without torque-load on the drive shaft.

Other objects will be apparent from the following description of preferred forms of the invention taken in connection with the accompanying drawings in which Fig. 1 is a front elevation of a machine embodying one form of the invention;

Fig. 2 is a front elevation of a machine employing a modified form of the invention;

Fig. 3 is a front elevation of another modification of the machine;

Fig. 4 is a front elevation of still another form of the invention;

Fig. 5 is a transverse section illustrating the arrangement of ware on an indexing carrier together with the relative positions of flames and ware;

Fig. 6 is a fragmentary top plan view of the speed change dwell shown in Fig. 1;

Fig. 7 is a fragmentary partial section of the intermittent drive employed in the machine illustrated in Fig. 2;

Fig. 8 is a side view of the gearing effecting intermittent rotation of the mechanism shown in Fig. 3;

Fig. 9 is a diagram of the index and dwell phases of the machine shown in Fig. 3;

Fig. 10 is a side elevation of the switch and cam actuator therefor employed in the embodiment shown in Fig. 4;

Fig. 11 illustrates the solenoid actuator for the clutch shown in Fig. 4; and

Figs. 12 and 13 represent modified forms of change speed units to be used in the machine illustrated in Fig. 4.

Referring to the drawings, it will be seen that a disk 15 carries a plurality of collet-type chucks 16 each holding a body 17, the body being glass ware heated by ring burners 18 and sharp flame burners 19, and shaped by a suitable forming tool 21. In the type of machine illustrated, the ware is a cylindrical vessel so that at most stations, of which there are twenty-four, a ring burner is employed to heat the edge of the open end of the ware. The tool is designed to form a pourout on the mouth of the vessel and is adapted to be raised and lowered by means of a pneumatically actuated piston 22 in cylinder 23. A bracket 24 is secured to the piston and carries the forming tool. Guide rod 25 is slidable in guide bearing 26 and maintains the tool in proper alignment with the ware.

In Figs. 1, 3 and 4, the means for intermittently rotating disk 15 include a circular indexing plate 27, equally spaced rollers 28 journaled concentrically thereon, indexing cam 29 on cylinder 30, and cam shaft 31. There are twenty-four rollers corresponding with the number of stations. Disk 15 is supported on and spaced from the indexing plate by column 32. Cam 29 is designed to move the indexing plate a distance equal to that between two adjacent rollers with each complete revolution of cylinder 30. In each of these figures, illustrating different forms of the invention, the cam shaft is driven through speed-modifying mechanism 33 from a prime mover, such as an electric motor 34.

Referring to Fig. 1, the change speed is a conventional variable speed reduction unit connected to the motor 34 through a second variable speed reduction unit 35, the latter units driving unit 33 by means of chain 36 and sprockets 37, 38. The change speed units 33, 35, are preferably the type in which expansible pulleys are connected by a belt drive and in which the pulleys comprise opposed cones axially movable with respect to each other to control the effective diameters thereof. One of the pulleys is on a driving shaft and the other on a driven shaft, the speed ratio of the shafts being varied by changing the effective diameters of the pulleys. Secured to cam shaft 31 is a cam 39 designed to rock arm 41 pivoted to the frame 42 at 43. Follower 44 on arm 41 rides on the cam. Transmission control arm 45 is connected by link 46 to arm 41. By throwing arm 45 in one or the other direction the rotative speed of cam shaft 31 may be varied. Hence, as arm 41 is rocked, the rotative speed of the cam shaft is decreased or increased, depending on the position of the arm. In the present machine, the cam shaft is rotated at an increased speed during the indexing phase and then decelerated while the ware support is stationary. It is also to be noted that, by means of the two cams 29 and 39, the ware-supporting table is uniformly accelerated and retarded. Furthermore, the total cycle of the whole machine may be varied through reduction unit 35.

Reciprocation of piston 22 and tool 21 is controlled by valve means indicated at 47 and actuated by cam 48.

In Fig. 2 there is illustrated another form of the invention, a Geneva type intermittent drive and mutilated gears being employed to provide for a relatively short indexing period as compared with total cycle time. Keyed to shaft 31 is a bevel gear 49 meshing with bevel gear 51 fast on shaft 52. Also secured to shaft 52 is a mutilated drive gear 53 designed to drive gear 54 on shaft 55, the latter having fast thereon a Geneva crank 56 cooperating with Geneva wheel 57 on the table indexing shaft 58. Cam 48 actuates the tool control valve 47 as in Fig. 1.

In this form of the invention, as illustrated, the ratio of gear 53 to gear 54 is 2:1. Gear 53 is continuously driven, but its speed or the time of cycle may be varied by adjusting the change speed unit 35. Gear 54, on the other hand, is rotated through 360° for one-half revolution of gear 53 and then locked while gear 53 turns 180°. The Geneva wheel is indexed 15° with each complete revolution of gear 54, but, since the Geneva crank is in engagement with the Geneva wheel for less than half of the revolution of gear 54, the ratio of index to dwell or locked position is between 1:5 and 1:10, depending on the design of the Geneva drive. The ratio of gears 53, 54 may be changed, as desired. Hence, it is obvious that, while gear 53 is driven continuously, the ware carrier is indexed quickly and a relatively long dwell obtained so that little heat is lost as the ware is indexed from one station to the next.

Fig. 3 illustrates still another embodiment of the invention. In this type of machine, there is interposed between the change speed unit 35 and cam 29 a pair of mutilated gears 61, 62, one fast on cam shaft 31, the other on counter shaft 63. Shaft 64 connected to motor 34 through unit 35 drives shaft 63 through gears 65, 66, keyed to the two shafts 64, 63, respectively. As shown in the drawings, the ratio of gear 65 to gear 66 is 2:1, while that of the gears 61, 62 is 1:1. These ratios may be changed, however.

Figs. 8 and 9 illustrate the phases corresponding to the dwell and indexing through gears 61, 62. Since cam 29 is effective to move the carrier table 27 only through 180° of its revolution and gear 62 turns twice for each revolution of gear 61, it is evident that the table is indexed in one-fourth the time shaft 63 turns as well as one-fourth the time cycle corresponding to the speed of shaft 31.

Fig. 4 illustrates a further modification of the invention. Motor 34 drives countershaft 67 through the variable reduction unit 35. Pulleys 68, 68', 69, 69' on shaft 67 and belts 71, 72 drive shafts 31, 73, respectively. Shaft 31 is adapted to be intermittently rotated by means of a single revolution clutch 74 connected to pulley 68'. In this type of clutch the driven shaft is normally locked against rotation, but when the lock is momentarily released the shaft is permitted to turn 360° whereupon the clutch is again automatically locked. The clutch release consists of a rocker arm 76 connected to the core of solenoid 77 by a link 78, as shown in Fig. 11. The solenoid is energized when switch 79 is closed. The means for closing this switch are shown in Fig. 10, and include a micro-adjustment of the phase angle at which the switch is closed to insure accurate timing of the index. Cam shaft 81 is driven from shaft 73 through a speed reducer 82. Cam disk 83 on shaft 81 carries a cam element 84 slidably mounted on pins 85 and adjustable circumferentially of the disks by means of the microscrews 86. Switch 79 includes a closing arm 87 having a roller 88 thereon and is mounted on a pivoted bracket 89 normally held against adjusting screw 91 by spring 92. The time during which the solenoid is energized may be governed by proper adjustment of the bracket by means of screw 91. With this arrangement the single revolution clutch is actuated by a solenoid, permitting the use of a low lift cam so that the clutch can be located at any desired position with respect to the main drive shaft. The variable change speed unit permits variable index time, dwell time and cycle time, while the machine is running. The cylinder cam is a small diameter low-inertia cam, fully 180° of which is used for index motion acceleration and retardation. Hence, the heavy indexed carrier is brought to a dead stop by the single revolution clutch and cylinder cam before the clutch releases.

In Figs. 12 and 13 are shown modifications of the variable change speed unit arrangement. Here, independent units 93, 94 are interposed between main unit 35 and shafts 31, 73. In this manner the ratios of index to dwell may be varied within wide limits.

The advantages of the several forms of the invention are obvious. Not only is there a wide range of limits on the ratio of dwell to index but odd ratios are readily available. The mechanisms provide positive uniform acceleration and retardation of the ware-carrying table, permitting use of easy cam curves and giving low torque on the drive shaft. There is no torque load on the drive shaft during dwell, thus avoiding heavy friction braking of the table between the index phases. At the same time, the indexing is accomplished with maximum speed to prevent loss of energy, heat, or the like.

In the claims, the expression "cam means" is intended to include face cams, cylinder cams, Geneva mechanism and the like.

While preferred embodiments of the invention have been shown and described, it is intended that variations thereof be included in the definitions of the invention as set forth in the appended claims.

Having described our invention, what we claim as new and desire to secure by Letters Patent is:

1. An indexing mechanism comprising a motor continuously rotating at constant speed, a rotatable member adapted to be indexed, rotary means for imparting intermittent rotation to said member, change speed mechanism connecting said motor to said means for varying the angular velocity of said means between predetermined high and low limits, and other means operable during each revolution of said rotary means for actuating said change speed mechanism whereby said rotary means is rotated first at said predetermined low limit, then at the high limit, and finally at the low limit at each revolution thereof.

2. An indexing mechanism comprising a motor continuously rotating at constant speed, a rotatable member adapted to be indexed, rotating cam means for intermittently rotating said member, change speed mechanism connecting said motor to said cam means for varying the angular velocity of said cam means between predetermined high and low limits, and means operable during each revolution of said cam means for actuating said change speed mechanism whereby said cam means is rotated first at said predetermined low limit, then at the high limit, and finally at the low limit at each revolution thereof.

3. An indexing mechanism comprising a motor continuously rotating at constant speed, a rotatable member adapted to be indexed, rotating cam means for intermittently rotating said member, change speed mechanism connecting said motor to said cam means for varying the angular velocity of said cam means between predetermined high and low limits, and other cam means operable during each revolution of said first-mentioned cam means for actuating said change speed mechanism whereby said first-mentioned cam means is rotated first at said predetermined low limit, then at the high limit, and finally at the low limit at each revolution thereof.

ROBERT E. BRUCKNER.
JOHN S. HARKER.